United States Patent
Li

(10) Patent No.: US 6,974,291 B2
(45) Date of Patent: Dec. 13, 2005

(54) QUICK COUPLING NUT

(76) Inventor: Feiyu Li, First Floor, #43, Huli Main Rd., Xiamen (CN) 361006

( * ) Notice: Subject to any disclaimer, the term of this patent is extended or adjusted under 35 U.S.C. 154(b) by 0 days.

(21) Appl. No.: 10/832,908

(22) Filed: Apr. 26, 2004

(65) Prior Publication Data

US 2005/0238460 A1 Oct. 27, 2005

(51) Int. Cl.[7] .................... F16B 37/08; F16B 37/16; F16B 39/36
(52) U.S. Cl. .................. 411/437; 411/433; 411/267; 411/429; 411/270
(58) Field of Search .................. 411/265, 267, 270, 411/433, 437, 429

(56) References Cited

U.S. PATENT DOCUMENTS

| | | | |
|---|---|---|---|
| 786,725 A | 4/1905 | Bryce | |
| 1,082,993 A | 12/1913 | Beattie | |
| 1,276,785 A | 8/1918 | McGinnis | |
| 1,366,884 A | 1/1921 | Nahrung | |
| 1,406,804 A | 2/1922 | Alexander | |
| 1,475,907 A | 11/1923 | Volman | |
| 1,652,169 A | 12/1927 | Fleming | |
| 1,915,588 A | 6/1933 | Arrington | |
| 2,021,051 A | 11/1935 | Desbrueres | |
| 2,367,480 A | 1/1945 | Beswick | |
| 2,489,613 A | 11/1949 | Beswick | |
| 2,567,579 A | 11/1951 | Donovan | |
| 2,576,579 A * | 11/1951 | Donovan | 411/267 |
| 2,664,023 A | 12/1953 | Mugford | |
| 2,676,509 A | 4/1954 | Graham | |
| 2,693,732 A | 11/1954 | Durst | |
| 2,748,647 A * | 6/1956 | Notturno | 411/433 |
| 2,814,325 A | 11/1957 | Shur | |
| 2,896,496 A | 7/1959 | Jansen | |
| 3,120,149 A | 2/1964 | Dickie | |
| 3,170,363 A | 2/1965 | Dickie | |
| 3,176,573 A | 4/1965 | Dickie | |
| 3,268,928 A | 8/1966 | Dickie | |
| 3,299,767 A | 1/1967 | Rover | |
| 3,312,264 A * | 4/1967 | Dresdner | 411/270 |
| 3,352,341 A | 11/1967 | Schertz | |
| 3,695,139 A | 10/1972 | Howe | |
| 3,813,984 A | 6/1974 | Sellander | |
| 3,926,090 A | 12/1975 | Bunker | |
| 3,952,626 A | 4/1976 | Townsend | |
| 4,082,468 A | 4/1978 | von Base | |
| 4,378,187 A | 3/1983 | Fullerton | |
| 4,478,546 A | 10/1984 | Mercer | |
| 4,619,569 A | 10/1986 | Wright | |
| 4,659,273 A * | 4/1987 | Dudley | 411/373 |
| 4,737,059 A | 4/1988 | Batten | |
| 4,930,961 A * | 6/1990 | Weis | 411/266 |
| 5,000,640 A | 3/1991 | Haas, Jr. | |
| 5,340,252 A * | 8/1994 | Weddendorf | 411/267 |

(Continued)

*Primary Examiner*—Katherine Mitchel
(74) *Attorney, Agent, or Firm*—Walter A. Hackler

(57) ABSTRACT

A quick coupling nut includes a body having a bore therethrough and adjacent side holes. A pair of threaded members are disposed in the bore and moveable in a radial direction of the bore and a cap having a bore therethrough, coaxial with the body bore, includes depending guides which are received by the guide holes for enabling axial movement between the cap and the body. Actuators depending from the cap engage the threaded members in order to urge the threaded members radially inward to engage a threaded bolt shank, extending through the cap and body bores, as the cap is moved axially toward the body. This threaded engagements enables tightening of the quick coupling cap by rotation about the threaded bolt shank.

16 Claims, 2 Drawing Sheets

U.S. PATENT DOCUMENTS

| | | | |
|---|---|---|---|
| 5,692,865 A | * 12/1997 | Pratt | 411/55 |
| 5,746,559 A | * 5/1998 | Shirai | 411/182 |
| 5,902,085 A | * 5/1999 | Yuta | 411/433 |
| 5,906,464 A | * 5/1999 | Wedenig | 411/433 |
| 5,944,467 A | * 8/1999 | Yuta | 411/270 X |
| 6,077,015 A | 6/2000 | Leibman | |
| 6,179,539 B1 | * 1/2001 | Benoit et al. | 411/433 |
| 6,250,524 B1 | * 6/2001 | Maruyama | 411/270 X |
| 6,321,623 B1 | * 11/2001 | Dykes et al. | 81/121.1 |
| 6,361,260 B1 | * 3/2002 | Schirrmacher | 411/433 |

* cited by examiner

QUICK COUPLING NUT

The present invention generally relates to nut and bolt fastening devices and is more particularly directed to a quick connecting coupler, or nut, for bolts and threaded studs.

Conventional nut and bolt arrangements have the disadvantage of requiring a great number of revolutions of the nut before the nut is brought in to a tight position. This often is not only inconvenient but difficult in many applications.

Accordingly, there is a need for quick coupling nuts which can rapidly interconnect members and thereafter tightly secure the members to one another.

In addition, there is typically a need for a self aligning coupler in order to center a threaded bolt or shaft within an oversized opening.

Such couplers find particular usefulness in difficult to access positions. For example, bolts for securing toilet seats to a toilet bowl are only accessible through the toilet bowl through awkward handling of a nut to be screwed thereon. In this instance, a quick connect coupling, such as disclosed hereinafter, provides for rapid bolting of a toilet seat to a toilet bowl without excessive rotation of a nut over an extended threaded shank extending through a rear platform of a toilet bowl.

SUMMARY OF THE INVENTION

A quick coupling nut in accordance with the present invention generally includes a body having a bore therethrough and adjacent guide holes therein. A pair of threaded members are disposed in the bore and moveable in a radial direction with regard to a bore axis.

A cap is provided which includes a bore therethrough, coaxial with the body bore, which includes depending guides that are received by the guide holes for enabling axial movement between the cap and the body.

Actuators, depending from the cap, are provided for engaging the threaded members in order to urge the threaded members radially inward to engage a threaded bolt shank, extending through the cap and body bores, as the cap is moved axially toward the body. The threaded engagement between the threaded members and the threaded bolt shank enables conventional tightening of the quick coupling nut by rotation thereof about the threaded bolt shank.

In operation, the cap is initially in a spaced apart relationship with the body which enables unresitricted radial movement of the threaded members. In this configuration, the cap and body are easily axially slid or moved along the threaded shank without engagement of the threaded members with the threaded shank until the cap reaches a bolt head or member being secured. At this point, the cap is moved toward the body and, as hereinabove noted, the threaded members radially urge to engage the threaded bolt shank thereafter enabling tightening of the quick coupling nut by rotation thereof.

Accordingly, the quick coupling nut in accordance with the present invention enables rapid insertion of the nut over a bolt shank until a limit is reached at which point the quick coupling nut of the present invention may be rotated in a conventional manner to tighten the knot.

Release of the nut may be effected through a counter rotation of the nut and thereafter separation of the cap from the body in order to enable rapid axial movement of the nut over the threaded shank for removal thereof.

More particularly, the quick coupling nut in accordance with the present invention may include a cap having an arcuate, or domed, top for enabling centering of the quick coupling nut in an aperture of larger diameter than the bolt shank as the quick coupling nut is moved axially along the bolt shank to engage the aperture.

This structural feature of the present invention enables automatic and accurate centering of the bolt shank within an aperture. This feature is of particular importance when the quick coupling nut of the present invention is utilized for fastening toilet seats to a toilet bowl.

Preferably, the threaded members are disposed at 180° from one another within the body bore and the quick coupling nut includes two actuators, each actuator disposed in the position for engaging a respective one of the pair threaded members.

More particularly, each of the actuators and threaded members include ramp portions for facilitating the radial movement of the threaded members as the cap is moved axially toward the body. Preferably, at least one of the guides includes a hooked end for engaging the body to prevent inadvertent separation of the cap from the body.

More particularly, each of the threaded members may include an arcuate portion having the threads thereon with the arcuate portion being subtended by guide lugs and the body includes notches for receiving the guide lugs to facilitate assembly of the quick coupling nut. In this manner, the threaded members may be assembled within the body bore without the threaded members blocking a central portion of the body bore which may interfere with insertion of the bolt shank therethrough.

In addition, one of the threaded members may include a protruding tab and the body may include a corresponding slot for receiving the tab to insure proper orientation of the threads for engagement with the threaded shank. In other words, tabs are utilized to uniquely identify each of the threaded members so that improper assembly is not possible.

Preferably, the threaded members are unbiased which enables outward radial movement which in turn enables axial movement of the quick coupling nut with the cap in a spaced apart relationship to facilitate disengagement of the actuators from the threaded members and in turn the threaded members from the threaded shank.

This structure facilitates the rapid removal of the quick coupling nut from the threaded shank as hereinabove noted.

BRIEF DESCRIPTION OF THE DRAWINGS

The advantages and features of the present invention will be better understood by the following description when considered in conjunction with the accompanying drawings in which.

DETAILED DESCRIPTION

Figure 1:
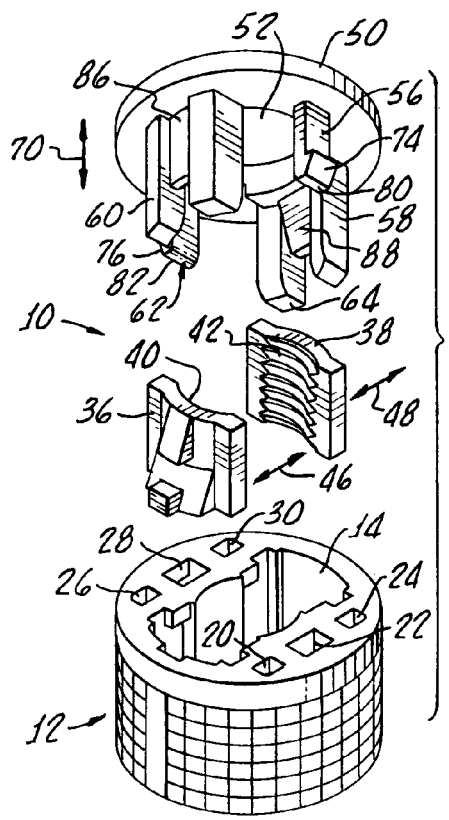
FIG. 1 is a perspective exploded view of a quick coupling nut in accordance with the present invention generally showing a body having a bore therethrough, a pair of threaded members and a cap having a bore therethrough along with depending guides which are received by guide holes within the body.

With reference to FIG. 1, there is shown a quick coupling nut 10 in accordance with the present invention which includes a body 12 having a bore 14 therethrough and adjacent guide holes 20, 22, 24, 26, 28, 30 therein. Members 36, 38 include threads 40, 42 and are disposed within the bore 14 of the body 12 and moveable in a radial direction of the bore as indicated by arrows 46, 48.

A cap 50 is provided with a bore 52 therethrough which includes depending guides 54, 56, 58, 60, 62, 64 which are received respectively by guide holes 20, 22, 24, 26, 28, 30 for enabling axial movement between the cap 50 and body 12 as indicated by the arrow 70. Removal of the cap 50 from the body 12 is prevented by hooks 74, 76 disposed on ends 80, 82 of guides 56, 62 respectively.

Figure 2:
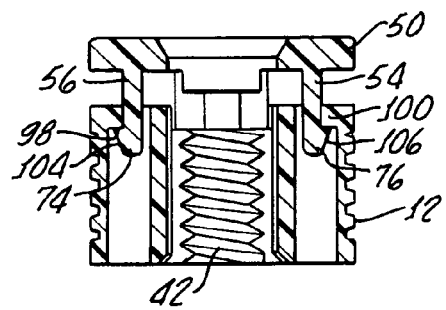
FIG. 2 is a cross sectional view of the quick coupling nut shown in FIG. 1 for illustrating hooks for engaging the body to prevent inadvertent separation of the cap from the body.
Figure 3:
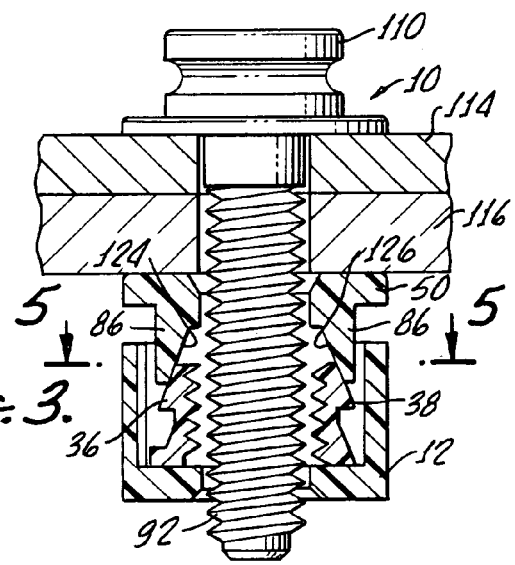
FIG. 3 is a cross sectional view of the quick coupling nut section illustrating actuators depending from the cap for engaging the threaded members in order to urge the threaded members radially to engage a threaded bolt shank, the figure illustrating the position of the threaded members before engagement with the bolt shank.
Figure 4:
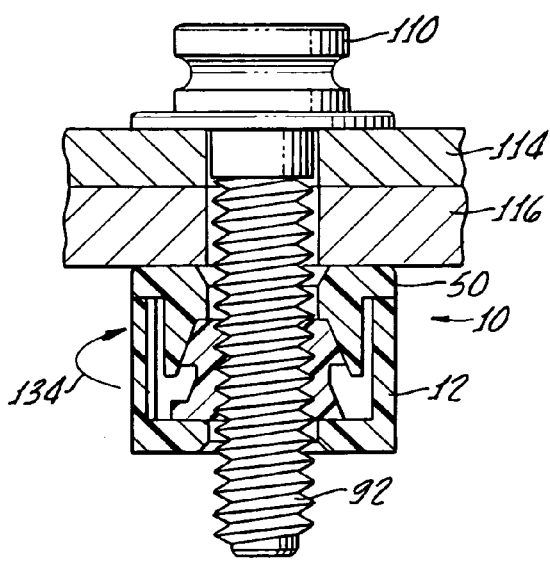
FIG. 4 is similar to FIG. 3 showing movement of the cap toward the body which urges the threaded members radially inwardly to engage the threaded bolt shank thereby enabling tightening of the quick coupling nut by rotation about the thread bolt shank.

Actuators 86, 88 depending from the cap 50 are provided for engaging the threaded members 36, 38 in order to urge the threaded members 36, 38 radially inward to engage a threaded bolt shank 92, see FIGS. 2–4, as the cap 50 is moved axially toward the body 12.

This threaded engagement enables tightening of the quick coupling nut 10 by rotation about a threaded bolt shank 92 as hereinafter described in greater detail.

It should be appreciated that all of the components of the quick coupling nut 10 may be formed from any suitable material such as plastic or metal. Preferably for applications, such as for use in securing a toilet seat to a toilet bowl, not shown, plastic or nylon materials are preferred. As most clearly illustrated in FIG. 2, the cap 50 is prevented from being removed from the body 12 by the hooks 74, 76 which engage an underside 98 of a body top 100.

Assembly of the cap 50 onto the body 12 is facilitated by ramps 104, 106 which enable the guides 56, 62 to be forced past the body top 100.

As further illustrated in the cross sectional view of FIG. 3 in which the cap 50 is in a spaced apart relationship with the body 12, the threaded members 36, 38 reside in a floating relationship within the body 12 for enabling rapid movement of the cap 50 and body 12 toward a bolt head and members 114, 116 which may represent a toilet seat and toilet bowl section respectively.

As best shown in FIGS. 3 and 4, the actuators 86, 88 include ramps 124, 126 for engaging ramps 130, 136 respectively on the threaded members 36, 38.

As illustrated in FIG. 4, upon engagement with the member 116, the cap 150 is moved axially into engagement with the body 12 which causes the actuators to urge the threaded members 36, 38 into engagement with the threaded shank 92 which enables tightening of the quick coupling nut by rotation of the nut 10 around the threaded shank 92 as indicated by the arrow 134.

Figure 5:
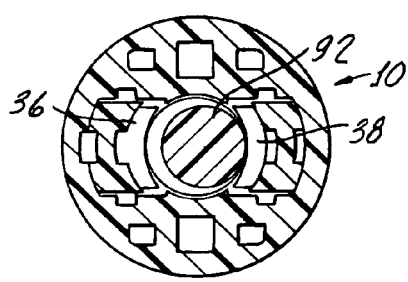
FIG. 5 is a cross sectional view of the quick release nut taken along the line 5—5 of FIG. 3.
Figure 6:
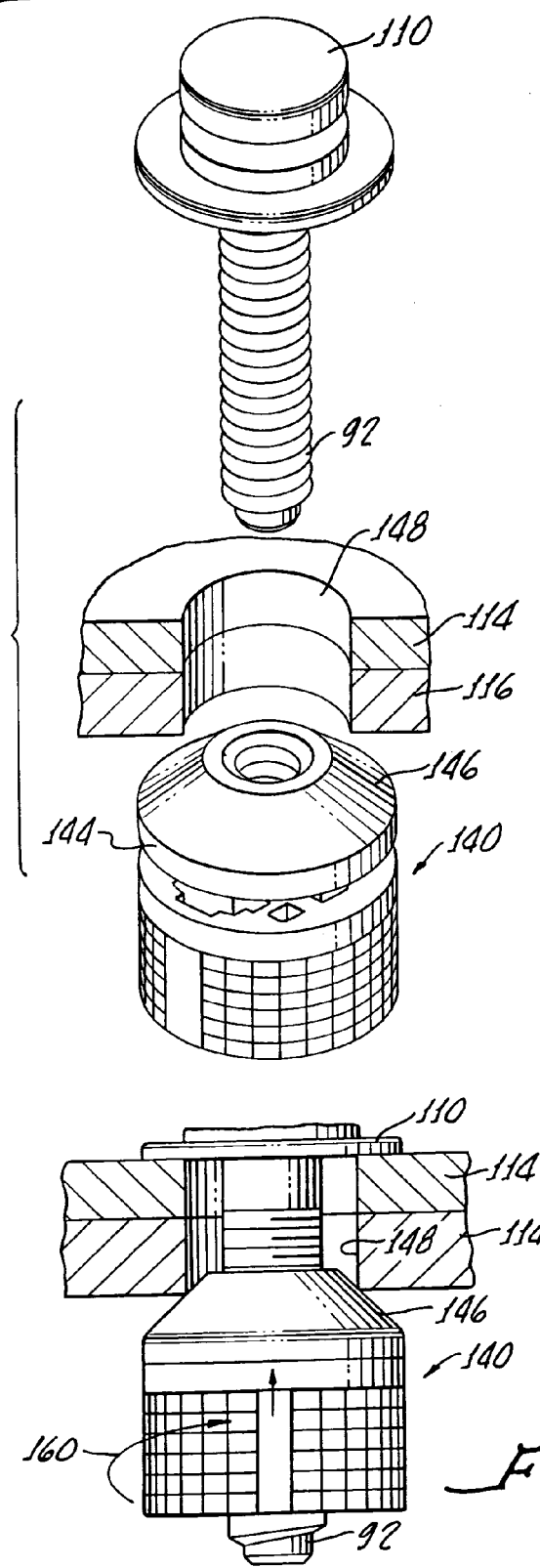
FIG. 6 is an alternative embodiment of the present invention showing in perspective a cap having an arcuate, or domed, top for enabling centering of the quick coupling nut in an aperture of larger diameter than the bolt shank thereby centering the bolt shank and the bolt within the aperture.
Figure 7:
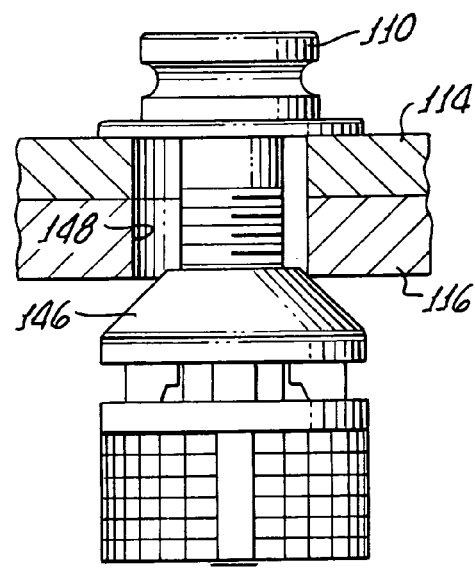
FIGS. 7–9 illustrate operation of the quick coupling nut shown in FIG. 6 in securing a seat member to a toilet bowl as hereinafter described in greater detail.
Figure 8:
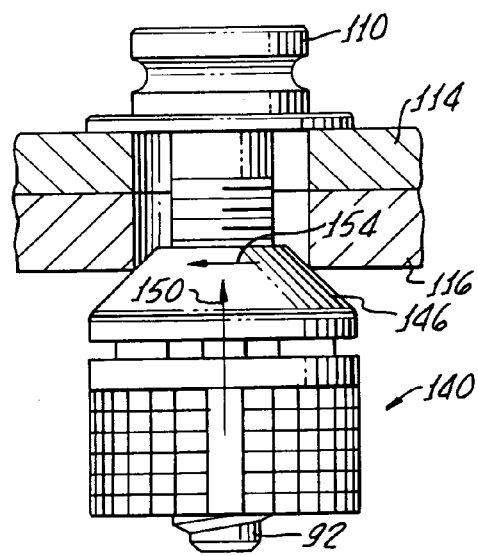

FIG. 5 is a cross sectional view taken along the line 5—5 of FIG. 3 illustrating the threaded members 36, 38 in a spaced apart relationship with the threaded shank 92 to enable axial movement of the nut 10 along the shank 12 as hereinabove noted.

With reference to FIGS. 6–9, there is shown an alternative embodiment 140 of a quick coupling nut in accordance with the present invention. Identical or substantially similar components are indicated with common reference characters hereinbefore described in connection with the embodiment 10.

The quick coupling nut 140 includes a cap 144 having an arcuate, or domed, top 146. As shown in FIGS. 6–9, this dome, or arcuate, top 146 enables centering of the quick coupling nut 140 in an aperture 148 of larger diameter than the bolt shank 92 as the quick coupling nut 140 is moved axially as indicated by the arrow 150 in FIG. 8.

This axial movement also causes engagement of the threaded members 36, 38, not shown in FIGS. 6–9, but hereinbefore described, to engage the bolt shank 92. Centering of the quick coupling nut 140 within the aperture is indicated by the arrow 154 in FIG. 8.

Figure 9:
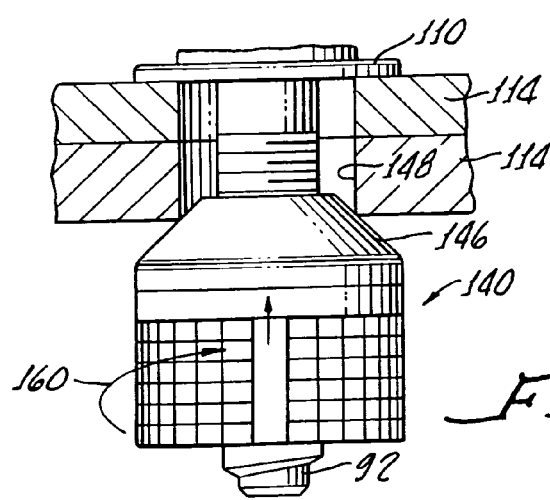

Thereafter, the quick coupling nut 10 may be rotated as indicated by the arrow 160 in FIG. 9 to secure, for example, a toilet seat cover 114 to a toilet bowl 116.

Although there has been hereinabove described a specific quick coupling nut in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

I claim:

1. A quick coupling nut comprising:
    a body having a bore therethrough and adjacent guide holes therein;
    a pair of spring free threaded members disposed in said bore such that the entire member of each threaded member is freely movable and without a substantially resilient component affecting thread member movement, in a radial direction of said bore;
    a cap having a bore therethrough, coaxial with the body bore, and depending guides, received by the guide holes, for enabling axial movement between said cap and said body; and
    spring free actuators, movable without a substantially resilient component affecting the actuators' movement, depending from said cap, for engaging the threaded members in order to urge the threaded members radially inward to engage a threaded bolt shank extending through the cap and body bores as said cap is moved axially toward said body, the threaded engagement enabling tightening of the quick coupling nut by rotation thereof about said threaded bolt shank.

2. The quick coupling nut according to claim 1 wherein the threaded members are disposed at 180° from one another within the body bore.

3. The quick coupling nut according to claim 2 further comprising two actuators, each actuator disposed in a position for engaging a respective member of said pair of threaded members.

4. The quick coupling nut according to claim 2 wherein each of the threaded members includes an arcuate portion having threads therein, the arcuate portion being subtended by guide lugs and said body includes notches for receiving said guide lugs to facilitate assembly of said quick coupling nut.

5. The quick coupling nut according to claim 4 wherein one of the threaded members includes a protruding tab and said body includes a corresponding slot for receiving the tab to ensure proper orientation of threads for engagement with the threaded shank.

6. The quick coupling nut according to claim 1 wherein each of the actuators and threaded members includes ramps for facilitating the radial movement of threaded members as the cap is moved axially toward said body.

7. The quick coupling nut according to claim 6 wherein at least one of the guides includes a hooked end for engaging said body to prevent inadvertent separation of said cap from said body.

8. The quick coupling nut according to claim 1 wherein the threaded members are unbiased for enabling outward radial movement for enabling axial movement of the quick coupling nut with the cap in a spaced apart relationship with said body, said spaced apart relationship causing disengagement of the actuators from the threaded members.

9. A quick coupling nut comprising:
  a body having a bore therethrough and adjacent guide holes therein;
  a pair of spring free threaded members disposed in said bore such that the entire member of each threaded member is freely movable and without a substantially resilient component affecting thread member movement, in a radial direction of said bore;
  a cap having a bore therethrough, coaxial with the body bore, and depending guides, received by the guide holes, for enabling axial movement between said cap and said body, said cap including a domed top for causing centering of said quick coupling nut in a aperture of larger diameter than the bolt shank as the quick coupling nut is moved axially along the bolt shank to engage said aperture; and
  spring free actuators, movable without a substantially resilient component affecting the actuators' movement, depending from said cap, for engaging the threaded members in order to urge the threaded members radially inward to engage a threaded bolt shank, extending through the cap and body bores, as said cap is moved axially toward said body, the threaded engagement enabling tightening of the quick coupling nut by rotation thereof about said threaded bolt shank.

10. The quick coupling nut according to claim 9, wherein the threaded members are disposed at 180° from one another within the body bore.

11. The quick coupling nut according to claim 10 further comprising two actuators, each actuator disposed in a position for engaging a respective member of said pair of threaded members.

12. The quick coupling nut according to claim 11 wherein each of the actuators and threaded members include ramps for facilitating the radial movement of threaded members as the cap is moved axially toward said body.

13. The quick coupling nut according to claim 12 wherein at least one of the guides includes a hooked end for engaging said body to prevent inadvertent separation of said cap from said body.

14. The quick coupling nut according to claim 10 wherein each of the threaded members includes an arcuate portion having threads therein, the arcuate portion being subtended by guide lugs and said body includes notches for receiving said guide lugs to facilitate assembly of said quick coupling nut.

15. The quick coupling nut according to claim 14 wherein one of the threaded members includes a protruding tab and said body includes a corresponding slot for receiving the tab to ensure proper orientation of threads for engagement with the threaded shank.

16. The quick coupling nut according to claim 9 wherein the threaded members are unbiased for enabling outward radial movement for enabling axial movement of the quick coupling nut with the cap in a spaced apart relationship with said body, said spaced apart relationship causing disengagement of the actuator from the threaded member.

* * * * *